(12) United States Patent
Erdmann

(10) Patent No.: US 9,892,422 B1
(45) Date of Patent: Feb. 13, 2018

(54) SALES SECURITY INTEGRATION

(75) Inventor: David Erdmann, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1685 days.

(21) Appl. No.: 12/748,876

(22) Filed: Mar. 29, 2010

(51) Int. Cl.
 *G06Q 30/00* (2012.01)
 *G06Q 30/02* (2012.01)

(52) U.S. Cl.
 CPC ..... *G06Q 30/0248* (2013.01); *G06Q 30/0185* (2013.01)

(58) Field of Classification Search
 CPC ............ G06C 30/0241; G06C 30/0248; G06C 30/0277; G06C 30/0276; G06C 30/018; G06C 30/0185
 USPC ............... 705/14, 318; 706/46, 47; 709/224; 726/24
 See application file for complete search history.

(56) References Cited

U.S. PATENT DOCUMENTS

| | | | | |
|---|---|---|---|---|
| 9,679,304 B1* | 6/2017 | Kim | ................... | G06Q 30/0251 |
| 2004/0143756 A1* | 7/2004 | Munson et al. | ............... | 713/200 |
| 2005/0197894 A1* | 9/2005 | Fairbanks | .......... | G06Q 30/0241 705/14.52 |
| 2006/0253581 A1* | 11/2006 | Dixon | ............... | G06F 17/30861 709/225 |
| 2007/0016951 A1* | 1/2007 | Piccard et al. | ................... | 726/24 |
| 2009/0094175 A1* | 4/2009 | Provos et al. | ................... | 706/12 |
| 2009/0099913 A1* | 4/2009 | Jiang | ................. | 705/14 |
| 2009/0158141 A1* | 6/2009 | Bauchot et al. | .............. | 715/239 |
| 2009/0327849 A1* | 12/2009 | Kavanagh | ............ | G06Q 10/107 715/205 |
| 2011/0119218 A1* | 5/2011 | Lay et al. | ........................ | 706/46 |
| 2011/0246278 A1* | 10/2011 | Kubo | ................... | G06Q 20/042 705/14.25 |
| 2013/0061326 A1* | 3/2013 | Bennett | ........................... | 726/24 |

OTHER PUBLICATIONS

Ion Androutsopoulos, John Koutsias, Konstantinos V. Chandrinos and Constantine D. Spyropoulos "An Experimental Comparison of Naive Bayesian and Keyword-Based Anti-Span Filtering with Personal E-mail Messages", Software and Knowledge Engineering Laboratory, Institute of Informatics and Telecommunications (2000), pp. 160-167.*

* cited by examiner

*Primary Examiner* — Anita Coupe
*Assistant Examiner* — Shelby Turner
(74) *Attorney, Agent, or Firm* — Thomas | Horstemeyer, LLP

(57) ABSTRACT

Disclosed are various embodiments of sales security integration. At least one embodiment of a method includes the steps of receiving contact data regarding a sales contact for a network site, and performing at least one security check on the contact data to determine a likelihood that the sales contact is a security risk for nefarious activity. In response to determining that the sales contact is a security risk for nefarious activity, the step of implementing at least one security measure is performed.

20 Claims, 11 Drawing Sheets

126c

Welcome to Client Development

| | | | |
|---|---|---|---|
| Company Name | Pro Basketball | Sales Person Name | Leigh Putnam |
| Company Address | n/a | | |
| Company Contact Person | John Doh | New Advertiser | ⊙ Yes ○ No ○ Don't Know |
| Contact Email Address | john@probasc... | Time and Date of Request | 1/1/2010 |
| Advertisement Location | Bottom Banner | Quoted Price | $10,000 |
| Advertisement Begin | 2 days | | |
| Advertisement Duration | 1 week | | |

302 — Submit    Clear

402

This person and/or company has been flagged as a potential security risk. No sales to this person and/or company may be made until further security measures are taken.

FIG. 4

Email Application Interface

| Reply | REPLY ALL | FORWARD | DELETE | ATTACH | PRINT | SAVE | OPTIONS |

From: John@probascetball.com [x]

To: salesperson@eretailer.com ← 602

> This contact has been flagged as a potential security risk. No sales may be received until further security measures are taken.

cc:

Subject: Advertising on E-Retailer

Dear Sir or Madam:
My name is John. I work with the Professional Basketball League. My company would like to advertise on your website within the next two weeks. We would like an advertisement at the bottom of the home page. Please contact me for more information. Thanks.

John Doh
Pro Basketball Advertiser
1-800-555-5555
John@probascetball.com

DONE

Email Application Interface

Contacts

Current View
- ◉ Address Cards
- ○ Phone List
- ○ By Category
- ○ By Company
- ○ By Location
- ○ By Follow-up Flag
- ○ By Whitelist
- ○ By Blacklist

| Casey Adams 702a<br>Saturn Motors<br>Sales Contact<br>Casey@saturn.com | Ashley Harrison<br>Druthers Restaurant<br>Sales Contact<br>Ashley@druthers.com | Tyler Richmond<br>Bartles and James<br>Sales Contact<br>Tylerr@bandj.com |
|---|---|---|
| Alison Care<br>Circuit City<br>Sales Contact<br>Alison@circuitcity.com | Charles Johnson<br>Burger Queen<br>Sales Contact<br>Chuck@burgerq.com | Tate Russell<br>Duff Beer<br>Sales Contact<br>Tate@duff.com |
| Pierce DeVan<br>Romany Reels<br>Sales Contact<br>Pierce@rreels.com | Clifford Loudenback<br>Coleco Vision<br>Sales Contact<br>Clifford@coleco.com | Bob Stoutenburgh<br>Buzz Cola<br>Sales Contact<br>Bobs@buzzcola.com |
| John Doh  702b<br>Pro Basketball<br>Sales Contact<br>john@probascetball.com | Terry McBrayer<br>Dunder Mifflin<br>Sales Contact  *(This contact has been flagged as a potential security risk. No sales may be received until further security measures are taken.)* | James Turek<br>Krusty Burger<br>Sales Contact<br>Jimmy@krusty.com |
| Mallory Fleskes<br>Begley's Pharmacy<br>Sales Contact<br>Mallory@begleys.com | Enron<br>Sales Contact<br>Andrew@enron.com | Sara Valles<br>Sir Putts A Lot Mini Golf<br>Sales Contact<br>Sara@sirputtsalot.com  702c |

Email

Calendar

DONE

FIG. 7

SALES SECURITY INTEGRATION

BACKGROUND

In the online retail market, online retailers will often offer products from one or more manufacturers. Additionally, some online retailers may use unused space on a network page for advertisement (or other) purposes of third parties who may or may not offer goods through the online retailer. As a nonlimiting example, if a business wishes to place an advertisement on the network site of the online retailer (or otherwise conduct business with the online retailer), the business may contact the online retailer for this purpose. Similarly, the online retailer may employ sales people to facilitate sales of advertisement space on the network site of the online retailer. Once an agreement for advertising on the network site of the online retailer is reached (or otherwise conducting business), the advertiser may send advertisement computer code to the online retailer that will be incorporated on the network site according to the terms agreed upon by the third party and the online retailer.

While the use of this space for third party advertisements may generate additional revenue for the online retailer, the online retailer may be at risk for nefarious activity, such as malware or other harmful code that is embedded in the advertisement code. Among other results, this code may be harmful to online shoppers and/or others that access the online retailer network site.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 4 is a drawing of an example client development user interface, further illustrating results of a security check, similar to the interface from FIG. 3, according to various embodiments of the present disclosure.

FIG. 6 is a drawing of an example email interface, illustrating results of a security check performed on the sender of an email to a sales person of the online retailer, similar to the interface from FIG. 5, according to various embodiments of the present disclosure.

FIG. 7 is a drawing of an example email interface, illustrating a contacts list, with one or more indicators for indicating results of a security check, similar to the interface from FIG. 6, according to various embodiments of the present disclosure.

DETAILED DESCRIPTION

Embodiments disclosed herein include systems and methods for providing one or more security checks for potential sales contacts. The potential sales contacts may include potential advertisers and/or others that conduct business with the online retailer. More specifically, in at least one nonlimiting example, when a sales contact sends information to an online retailer, a sales contact security application may perform a check based on one or more criteria to determine if the sales contact is likely to be a security risk (e.g. that they intend to upload malware hidden in an advertisement on the online retailer's network site). The one or more checks may include a configurable scoring system where each criterion is individually weighted. The weighted score for a particular sales contact may be compared to a predetermined threshold score. If, based at least upon the sales contact score in comparison to the threshold score, it is determined that the sales contact is a potential security risk, further security measures may be taken.

Similarly, some embodiments may be configured for training the sales contact security application to dynamically adapt security checks based on previous security requests. Such a configuration may include a sales contact security training application on a computing device that is configured for analyzing previous security requests to determine patterns of criteria not currently utilized in security checks currently performed.

Figure 1:
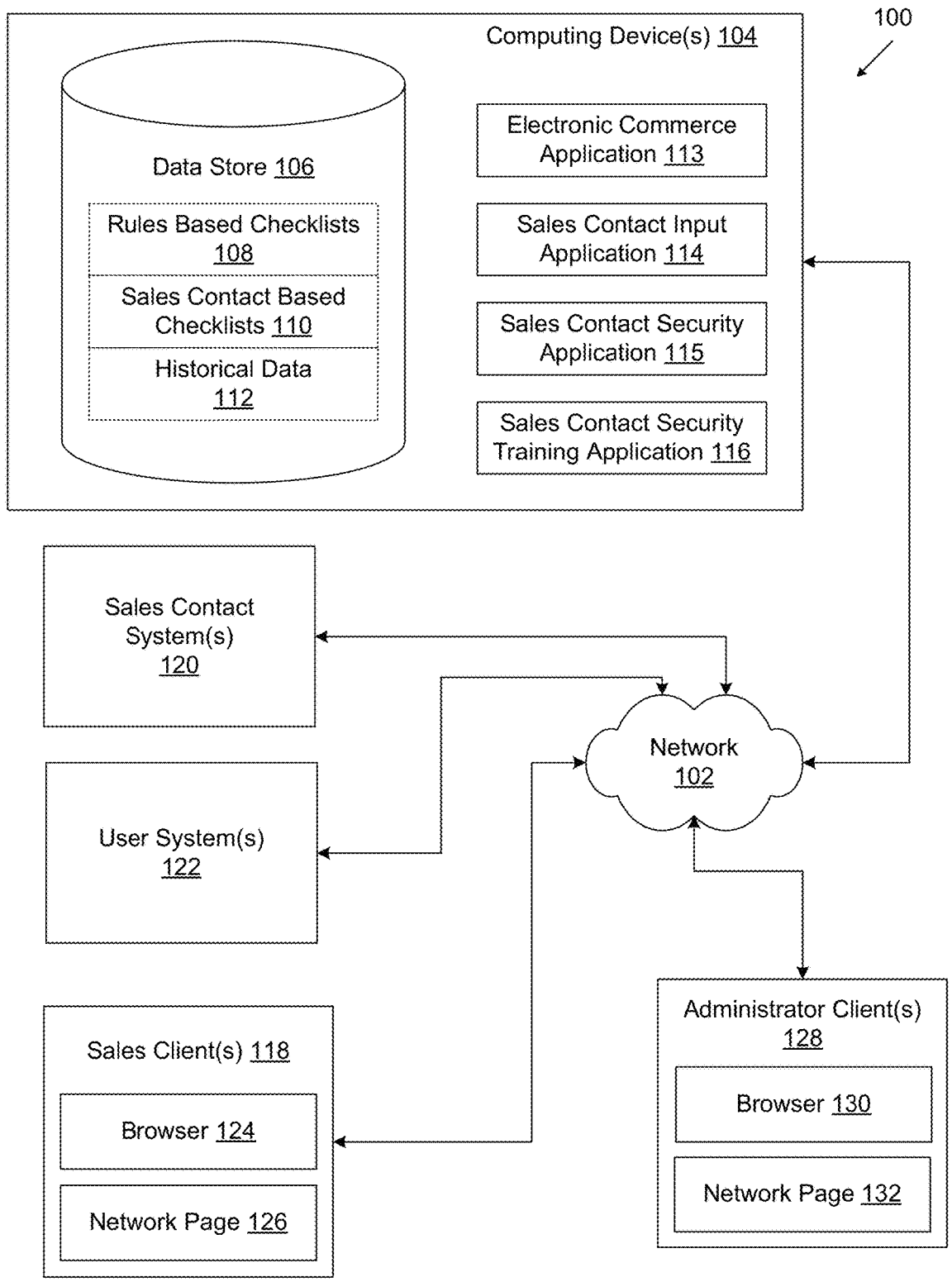
FIG. 1 is a drawing of an example computing environment for implementing a sales contact security check, according to various embodiments of the present disclosure.

Referring now to the drawings, FIG. 1 is a drawing of an example computing environment 100 for implementing a sales contact security check. As illustrated, a network 102 may be included in the computing environment 100 and includes, for example, the Internet, intranets, extranets, wide area networks (WANs), local area networks (LANs), wired networks, wireless networks, or other suitable networks, etc., or any combination of two or more such networks.

Also included in the computing environment 100 are one or more computing devices 104. The computing device 104 may comprise, for example, a server computer or any other computing device or system providing computing capability. The computing device 104 may represent multiple computer systems arranged, for example, in one or more server banks or other arrangements. To this end, the computing device 104 may comprise, for example, a cloud computing resource, a grid computing resource, and/or any other distributed computing arrangement. Such computer systems may be located in a single installation or may be dispersed among many different geographical locations. In at least one embodiment, the computing device 104 represents a virtualized computer system executing on one or more physical computing systems. For purposes of convenience, the computing device(s) 104 is referred to herein in the singular. However, in one embodiment, the computing device 104 represents a plurality of computer systems arranged as described above.

Various applications and/or other functionality may be executed in the computing device 104 according to various embodiments. Also, various data is stored in a data store 106 that is accessible to the computing device 104. The data store 106 may be representative of a plurality of data stores as can be appreciated. The data stored in the data store 106, for example, is associated with the operation of the various applications and/or functional entities described below. As a nonlimiting example, stored in the data store 106 are rules based checklists 108, sales contact based checklists 110, historical data 112, and other data.

The components executed on the computing device 104, for example, include an electronic commerce application 113, a sales contact input application 114, a sales contact security application 115, a sales contact security training application 116, and other applications, services, processes, systems, engines, or functionality. In at least one nonlimiting example, the electronic commerce application 113 may be configured to receive sales contact application data from a sales client 118, described in more detail below. The sales contact input application 114 may be configured to receive the request from the electronic commerce application 113 and analyze the received data related to the potential sales contact (such as an advertiser) for processing the sales contact application. Similarly, the sales contact security application 115 may include an application program interface (API) and may be executed to determine whether a sales contact is a potential security risk to an online retailer and/or visitors of the online retailer. Similarly, the sales contact security training application 116 may also include an API and may be configured to analyze data related to previous sales contact applicants to determine common information related to security risks, as well as common information related to non-security risks. After making these determinations, the sales contact security training application 116 may communicate with the sales contact security application 115 to adapt the criteria utilized by the sales contact security application to determine potential security risks.

Also included in the computing environment 100 are the sales client(s) 118, sales client system(s) 120, and user system(s) 122 (also referred to herein in the singular). The sales contact system 120 may include one or more client devices that are operated by potential sales contacts. Similarly, the sales client 118 may include one or more client devices that are operated by sales people of the online retailer. The sales client 118 may be representative of a plurality of client devices that may be coupled to the network 102. The sales client 118 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. Similarly, the user system 122 may include a browser (not explicitly illustrated in FIG. 1) and be operated by an online shopper to purchase goods and/or services, as described in more detail below.

The sales client 118 may be configured to execute various applications such as a browser 124, and/or other applications. Depending on the particular embodiment, browser 124 may include and/or be configured to utilize an email application and/or other application for facilitating communications. As described in more detail below, the browser 124 may be configured to receive information regarding a potential sales contact and send the data to the computing device 104 to determine whether the potential sales contact likely has malicious intent for nefarious activity. The browser 124 may also be configured to access and render network pages (such as network page 126), such as web pages, or other network content served up by the computing device 104 and/or other servers.

Additionally included in the nonlimiting example of FIG. 1 is an administrator client 128, which may be configured to store and/or execute a browser 130. The browser 130 may also include an API and may be configured to receive and/or render network pages (e.g., network page 132), send administrative data to the computing device 104, and/or provide other functionality, as described in more detail below.

Also included in the nonlimiting example of FIG. 1 is the electronic commerce application 113. The electronic commerce application 113 is executed in order to facilitate the online purchase of items 204 over the network 102. The electronic commerce application 113 also performs various backend functions associated with the online presence of a merchant in order to facilitate the online purchase of items 204 as will be described. For example, the electronic commerce application 113 generates network pages, such as web pages or other types of network content that are provided to clients 120 and/or 128 for the purposes of selecting items for purchase, rental, download, lease, or other form of consumption and to perform other functions, as will be described.

Figure 2:
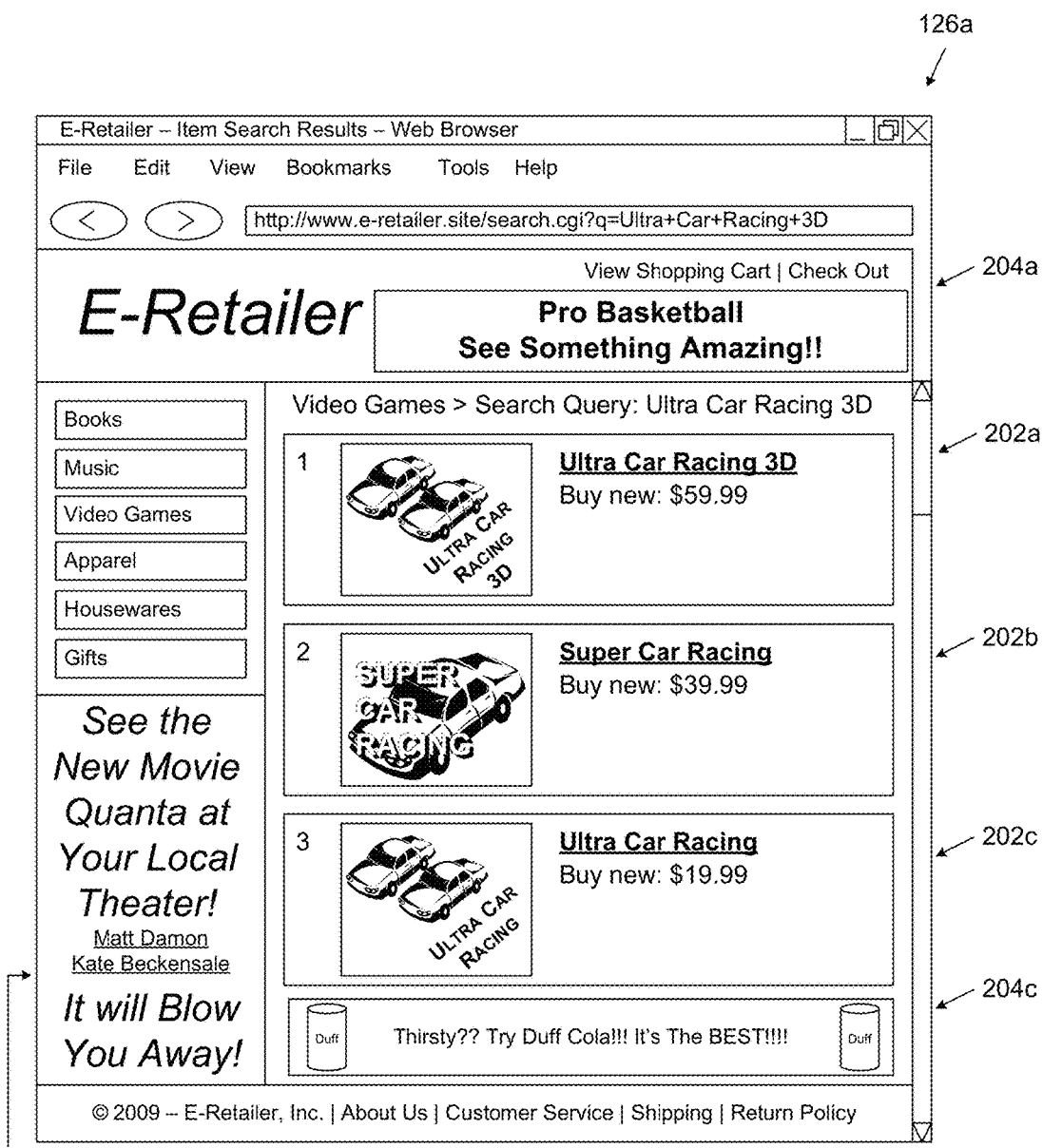
FIG. 2 is a drawing of an example network interface that may be provided by an online retailer, such as via the computing device from FIG. 1, according to various embodiments of the present disclosure.

FIG. 2 is a drawing of an example network page 200 that may be provided by an online retailer to a user, such as via the computing device 104 from FIG. 1, according to one embodiment. As illustrated in the nonlimiting example of FIG. 2, the network interface 126a may be provided by the electronic commerce application 113 to an online shopper (e.g., via the user system 122) and/or others who navigate to the online retailer network site. The network interface 126a may be rendered by the browser present one or more items 202a, 202b, and 202c. The items 202a, 202b, and 202c may be for sale to online shoppers. Additionally included are one or more advertisements 204a, 204b, and 204c (collectively referred to as advertisements 204). The advertisements 204 may be configured to promote goods, services, and/or messages to online shoppers without providing a purchase option in the network interface 126a. The advertisements 204 may be placed on the network interface 126a by the online retailer, in exchange for payment from an advertiser. Depending on the placement of the advertisement, the display time for the advertisement, and/or other factors, the advertisement fee can vary. As a nonlimiting example, the advertisement 204a is located at the top of the network interface 126a and may be fixed such that it will always be displayed. Due to this high visibility, an advertisement 204a at this position may demand a higher fee than the space of advertisement 204b, which is lower on the network interface 126a. Similarly advertisement 204a may have higher visibility than the space of advertisement 204c, which is located at the bottom of the network interface 126a and may not be fixed. This may mean that when an online shopper scrolls up on the network interface 126a, the advertisement is no longer displayed.

Figure 3:
FIG. 3 is a drawing of an example client development user interface that may be provided to a sales person of the online retailer, such as via the sales client from FIG. 1, according to various embodiments of the present disclosure.

FIG. 3 is a drawing of an example client development interface 126b that may be provided to a sales person of the online retailer, such as via the sales client 118 from FIG. 1. As illustrated in the nonlimiting example of FIG. 3, the client development interface 126b may be configured to receive data entered by a sales person in relation to a sales contact, such as a potential advertiser of the online retailer. The client development interface 126b is generated, for example, by the sales contact input application 114 (FIG. 1), which may be sent to the sales client 118 for display via the browser 124. The client development interface 126b may be configured to receive data such as company name, company address, company contact, and contact email address. Additionally, the client development interface 126b may request and/or receive information such as advertisement location (where the advertisement is requested to be positioned in the online retailer network site), how soon the advertisement is to be displayed, and how long the advertisement is to be presented on the online retailer network site. Other information may include a sales person name, whether the advertiser has previously advertised with the online retailer, the time and date of the request (e.g., when did the advertiser request the advertisement space), and the quoted price for the advertisement. One should note that, depending on the particular configuration, other information and/or permutations of information may also be utilized in the client development interface 126b. Upon input of the requested information in the client development interface 126b, the sales person (or other user) may select a submit option 302 to submit the information to the computing device 104. Also included is a browse option 304 for allowing the sales person to attach the advertisement to be displayed on the network site. Similarly, where the sales contact is not a potential advertiser, data may be input related to the business to be conducted with the online retailer.

FIG. 4 is a drawing of an example of the client development interface 126b, further illustrating results of a security check. As illustrated in the nonlimiting example of FIG. 4, in response to selection of the submit option 302 on the client development interface 126b, data is sent from the browser 124 to the sales contact security application 115. The sales contact security application 115 may receive the data, analyze the data, and determine whether the sales contact is a potential security risk.

More specifically, to determine whether the sales contact is a security risk, the sales contact security application 115 may also determine whether the email address submitted is a valid email address, or whether this sales contact has advertised or otherwise conducted business with the online retailer in the past. The sales contact security application 115 may also determine whether this sales contact has a valid telephone number. The sales contact security application 115 may further determine whether the sales contact email address is conspicuously close to other valid email addresses (such as an advertiser having an email "john@probascetball.com" instead of john@probasketball.com"). Similarly, the sales contact security application 115 may determine whether this sales contact has contact information or an Internet protocol (IP) address that links the sales contact to undesirable geographic regions that are notorious for malware and other malicious activities. In some embodiments, the sales contact security application 115 may determine whether an Internet search of online communities includes any disparaging comments regarding this sales contact. Similarly, a determination can be made whether the fee for the business (such as placing advertisement on the network site of the online retailer) is sufficiently low to indicate an increased risk of malware. The sales contact security application 115 may determine whether the timeframe of the business arrangement (e.g., placing the advertisement on the network site of the online retailer) indicates a greater likelihood of this sales contact being a security risk (e.g., if this sales contact wants the advertisement posted in two days, when the average time to post an advertisement is two weeks, the sales contact might be a security risk). Based on these criteria and/or other criteria, which are weighted, as discussed in more detail below, the sales contact security application 115 can determine whether the sales contact is a security risk. In response to this determination, the sales contact security application 115 sends data regarding this analysis, which is displayed in section 402 in the client development interface 126b.

In the nonlimiting example of client development interface 126b, the section 402 indicates that the sales contact "Pro Basketball" with the contact person "John Doh" is a security risk. As indicated, the contact email address is suspect, as well as the fact that this is a new advertiser, the advertisement begin date is very short, the advertisement duration is short, and the quoted price is small. One or more of these issues may contribute to a determination that this potential advertiser is a security risk. Accordingly, in order for this sales contact to be approved for advertising with the online retailer, further security measures may be performed. As a nonlimiting example, the additional security measures may include analysis of the advertisement code, interacting with the contact person (e.g., John Doh) to determine additional company information, and/or performing other security measures.

Figure 5:
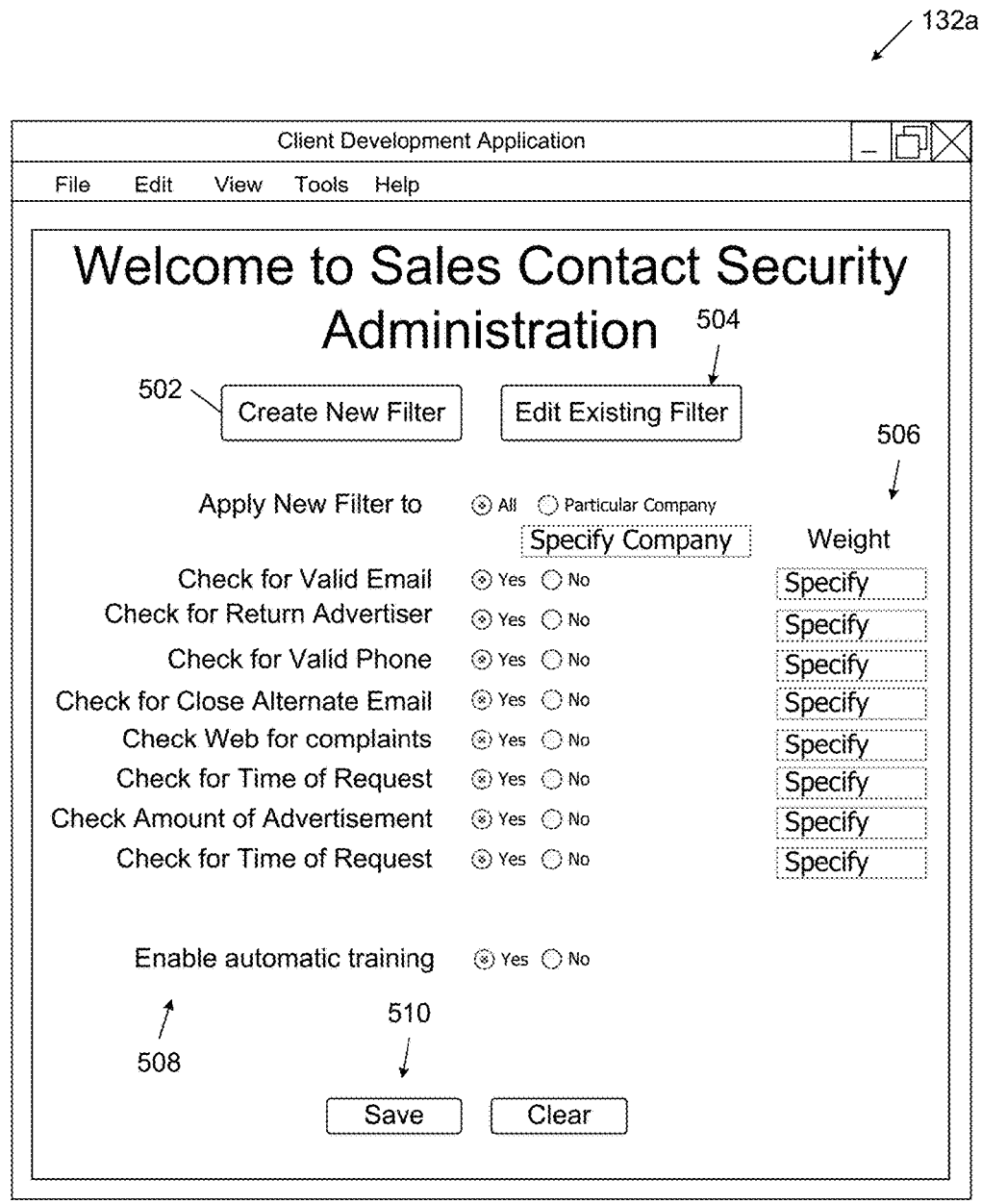
FIG. 5 is a drawing of an example sales contact security administration interface for indicating one or more criteria for a security check, similar to the interface from FIG. 4, according to various embodiments of the present disclosure.

FIG. 5 is a drawing of an example sales contact security administration interface 132a for indicating one or more criteria for a security check, similar to the interface from FIG. 4. As indicated above with regard to FIG. 4, one or more security checks may be performed by the computing device 104 to determine whether a sales contact is a security risk. To this end, an administrator for the online retailer may be provided (e.g., via the sales contact security application 115 and rendered by the browser 130) with the sales contact security administration interface 132a to determine the security checks and weighting for sales contacts. More specifically, a new filter for performing security checks may be created by selection of a create new filter option 502. An existing filter may be edited by selection of an edit existing filter option 504.

Regardless, a particular filter may be customized according to a plurality of options, including whether to apply the filter to all sales contacts, to a particular company, to a particular type of potential sales contact, and/or to other criteria. As a nonlimiting example, if a company indicates to the online retailer that all advertisement requests will include a secret password, such a requirement may be created only for that company.

As discussed above, options that the administrator may select include checking for a valid email address, checking for whether this sales contact has advertised (or otherwise conducted business) with the online retailer previously, checking whether the telephone number is valid, and/or other options. Some embodiments may include checking whether there are conspicuously close valid email addresses, checking whether there are any network complaints, checking the time of the request, checking the dollar amount of the business, and/or checking the time of the request and potentially other options.

In addition to the plurality of security check options that may be selected, a weight option 506 may also be included. More specifically, in at least one nonlimiting example, the sales contact security administration interface 132a may be configured to receive weightings for one or more of the selected security checks. As a nonlimiting example, if a valid email address is essential to this particular online retailer for sales contacts, the administrator may select a weight of 100 or other appropriate value. However, if the time of request for an advertisement is important, but less so than other criteria, the administrator may select a weight of 20 or other appropriate value.

Also included in the sales contact security administration interface 132a is an enable automatic training option 508. As discussed in more detail below, automatic training can provide dynamic security checks that adapt based on common criteria of previously determined security risks. After selecting the desired options in the sales contact security administration interface 132a, the administrator may select a save option 510 to save the selected criteria.

FIG. 6 is a drawing of an example email interface 126d, illustrating results of a security check performed on the sender of an email to a sales person of the online retailer, similar to the interface from FIG. 5, according to various embodiments. As illustrated in the nonlimiting example of FIG. 6, the email interface 126d may be provided by the browser 124 and may be configured to provide received emails from a sales contact to a sales person of the online retailer. The email message may include one or more sender email addresses (displayed and/or in metadata that accompanies the email). Similarly, the email message may include one or more recipient email addresses, one or more courtesy copy email addresses, one or more blind courtesy copy addresses, and a subject line. Additionally, included in the email is a message body, which may include a request for advertising (or otherwise conducting business) with the online retailer, a timeframe, a location for the advertisement, contact information, and/or other data.

Upon receipt of the email message by the sales client 118, browser 124 (with the assistance of the sales contact input application 114, the sales contact security application 115 and/or other applications) can analyze the metadata and/or payload data of the email message to determine characteristics of the email sender. More specifically, a determination may be made regarding whether the sender is a sales contact. Similarly, the contact information of the sender and/or other information may also be determined. The data from the email message may be sent to the sales contact security application 115 to determine whether this sales contact is a security risk. The sales contact security application 115 may make this determination and send data regarding the results of the security check back to the sales client 118. Accordingly, when the message is received at the sales client 118, the email interface 126d may provide an indicator 602 regarding whether the sender is a security risk, not a security risk, or whether there is not enough information to determine whether the sender is a security risk. Such a configuration could preclude the necessity of manually entering this information, such as in the client development interface 126b from FIG. 3 and/or could facilitate an automatic population of the data determined from the email interface 126d into the client development interface 126b from FIG. 3.

One should note that while the description regarding FIG. 6 refers to a received message, similar functionality may be provided for outgoing email messages. Further, while the description of FIG. 6 also refers to email messages, other forms of electronic communications, such as instant messages, text messages, multimedia messages, etc. may also be included with this functionality.

FIG. 7 is a drawing of an example email interface 126e, illustrating a contacts list, with one or more indicators for indicating results of a security check, similar to the interface from FIG. 6. As illustrated in the interface 126e, one or more contacts of a sales person may be listed. The contacts may be acquired in any of a plurality of different ways including manually entering the data, synchronizing with another device, etc. Regardless of the manner in which the contacts are acquired, the email interface 126e may include an application programming interface (API) that can communicate with the sales contact security application 115 to determine whether one or more of the contacts are security risks. As a nonlimiting example, the sales contact security application 115 can access historical data 112 to determine whether there have been previous determinations regarding one or more of the contacts. Additionally, the sales contact security application 115 may analyze the data as discussed above, to determine the level of security risk.

Once a determination is made regarding whether a contact is a security risk, indicators 702a, 702b, and 702c can be associated with the respective contacts. As illustrated, if it is determined that the contact is not a security risk, the indicator 702a may be provided. If it is determined that a contact is a security risk, the indicator 702b may be provided. If it is determined that the risk for a contact cannot be determined, the indicator 702c may be provided.

Figure 8:
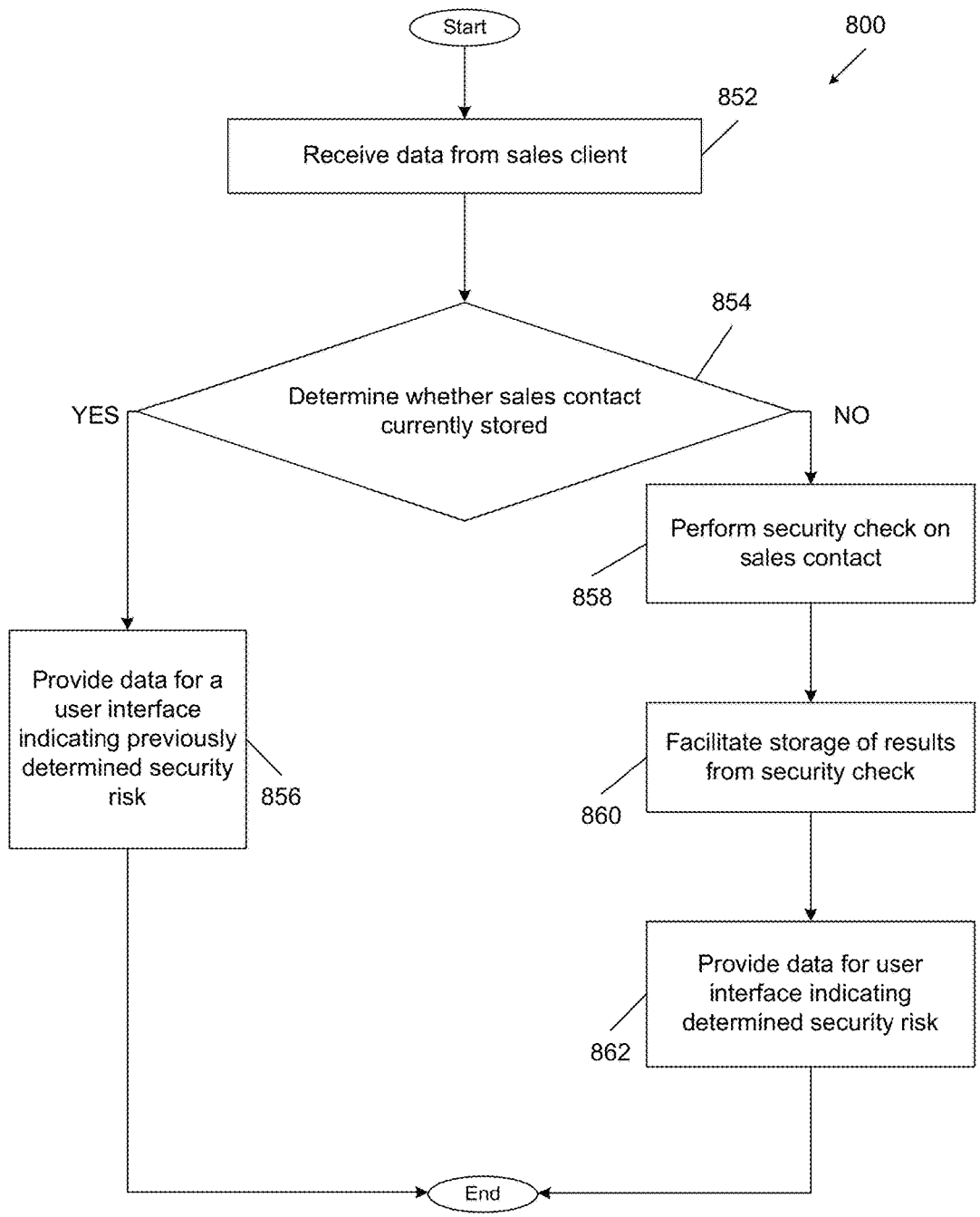
FIG. 8 is a drawing of an example process that may be utilized for a local determination of a security risk, such as may be performed in the computing environment 100 from FIG. 1, according to various embodiments of the present disclosure.

Referring next to FIG. 8, shown is a flowchart 800 that provides one example of the operation of a portion of the sales contact security application 115 according to various embodiments. It is understood that the flowchart of FIG. 8 provides merely an example of the many different types of functional arrangements that may be employed to implement the operation of the portion of the sales contact security application 115, as described herein. As an alternative, the flowchart of FIG. 8 may be viewed as depicting an example of steps of a method implemented in the computing device 104 (FIG. 1) according to one or more embodiments.

As illustrated in block 852, the sales contact input application 114, as executed by the computing device 104, can receive the data from the sales client related to a security check. The received data may be in response to an incoming message, an outgoing message and/or a contact from the sales client 118. Additionally, in block 854, a determination can be made whether information on the sales contact is currently stored. This determination can include determining whether the information is stored locally on the computing device 104 and/or determining whether the information is stored remotely. In block 856, if the information regarding the sales contact is currently stored, data may be provided for a user interface (e.g., client development interface 126b in FIG. 4) to be displayed on the sales client 118. As discussed above, this interface may be configured to indicate the previously determined security risk.

If however, in block 858, the information is not currently stored, a security check may be performed on the sales contact. As discussed in detail above, this security check can include any of a plurality of different criteria. In block 860, the results from the security check can be stored, which may include local and/or remote storage. In block 862, data for a user interface (e.g., client development interface 126b in FIG. 4) may be provided that indicates the determined security risk. This user interface may be displayed at the sales client 118.

Figure 9:
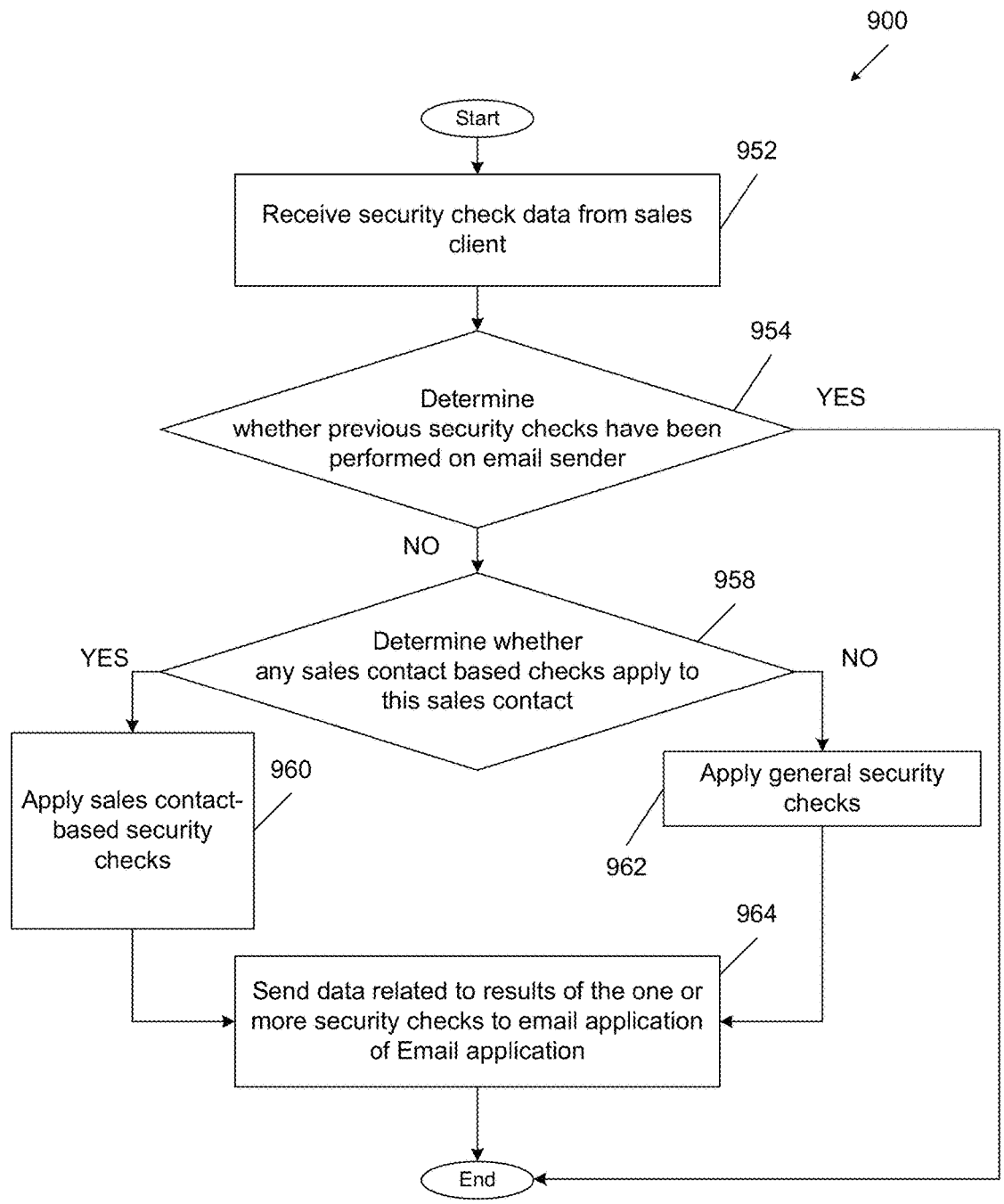
FIG. 9 is a drawing of an example process that may be utilized for performing one or more security checks on a sales contact applicant, such as may be performed in the computing environment from FIG. 1, according to various embodiments of the present disclosure.

FIG. 9 illustrates a flowchart 900 that provides one example of the operation of a portion of the sales contact security application 115, according to various embodiments. It is understood that the flowchart of FIG. 9 provides merely an example of the many different types of functional arrangements that may be employed to implement the operation of the portion of the sales contact security application 115, as described herein. As an alternative, the flowchart of FIG. 9 may be viewed as depicting an example of steps of a method implemented in the computing device 104 (FIG. 1) according to one or more embodiments.

As illustrated in block 952, the sales contact security application 115, as executed by the computing device 104 can receive data related to a security check from the sales client 118. As discussed above, this data may be received in response to an incoming message, an outgoing message and/or a contact analysis. Additionally in block 954, a determination can be made whether any previous security checks have been performed on the email sender. If so, the data from those previous security checks may be utilized and the process may end. If not, in block 958, a determination can be made whether any sales contact based checks apply to this sales contact. In block 960, if there are sales contact specific checks, the sales contact based security checks may be performed, such as via the sales contact based checklists 110. If however, there are no sales contact based security checks, in block 962, the rules based checklists 108 can be accessed and the general security checks can be applied. Regardless, in block 964, data related to the results of the one or more security checks can be sent to the browser 124 of the sales client 118. In block 966, the email and/or contact can be marked according to the received data.

Figure 10:
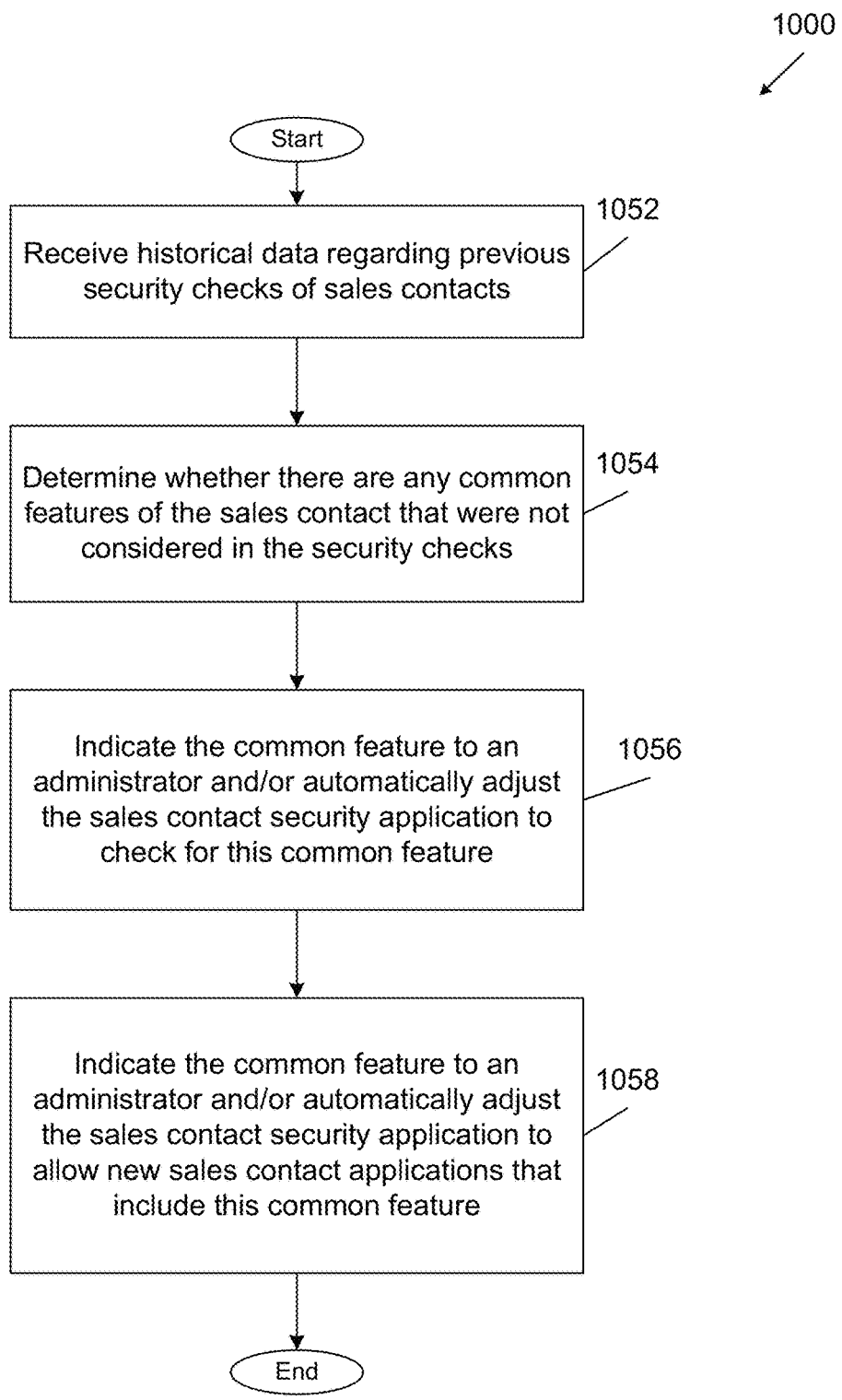
FIG. 10 is a drawing of an example process that may be utilized for training a sales contact security application, similar to the process from FIG. 11, according to various embodiments of the present disclosure.

FIG. 10 illustrates a flowchart 1000 that provides one example of the operation of a portion of the sales contact security training application 116, according to various embodiments. It is understood that the flowchart of FIG. 10 provides merely an example of the many different types of functional arrangements that may be employed to implement the operation of the portion of the sales contact security training application 116, as described herein. As an alternative, the flowchart of FIG. 10 may be viewed as depicting an example of steps of a method implemented in the computing device 104 (FIG. 1) according to one or more embodiments.

As illustrated in block 1052, the sales contact security training application 116 via the computing device 104 can receive historical data regarding previous security checks of sales contacts. In block 1054, at least one check may be performed to determine whether there are any common features of the sales contacts that were not considered in the security checks. In block 1056, in response to a determination that there is at least one common feature for previously identified security threats, the sales contact security training application 116 can indicate the common feature to the administrator client 128 and/or automatically adjust the sales contact security application to check for this common feature. In block 1058, in response to a determination that there is at least one common feature for previously identified non-security threats that are not also present in the previously identified security threats, the sales contact security training application 116 can indicate the common feature to the administrator client 128 and/or automatically adjust the sales contact security training application 116 to allow new sales contacts that include this common feature.

Figure 11:
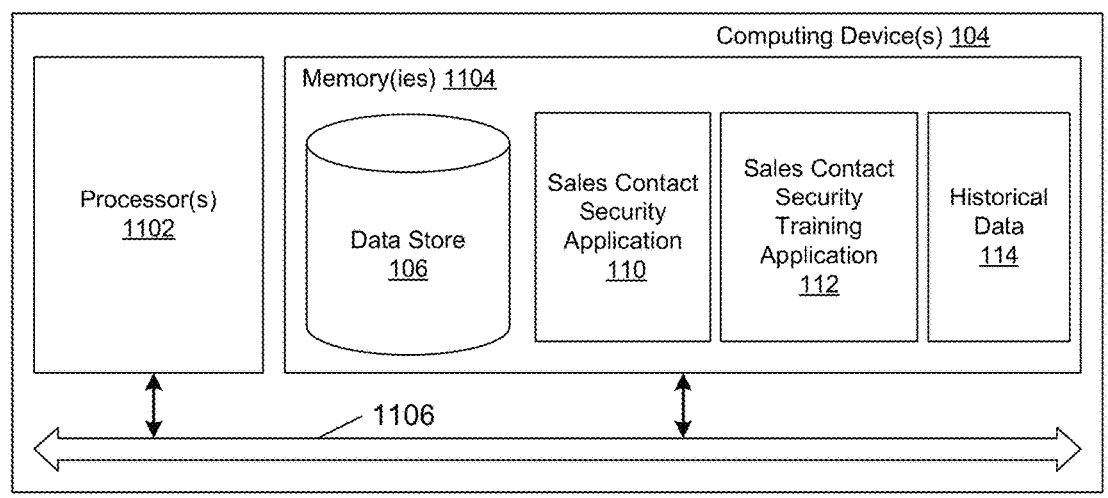
FIG. 11 is a drawing of an example computing device, such as may be utilized in the computing environment from FIG. 1, according to various embodiments of the present disclosure.

With reference to FIG. 11, shown is a schematic block diagram of the computing device 104 according to an embodiment of the present disclosure. The computing device 104 includes at least one processor circuit, for example, having a processor 1102 and a memory 1104, both of which are coupled to a local interface 1106. To this end, the computing device 104 may comprise, for example, at least one server computer or like device. The local interface 1106 may comprise, for example, a data bus with an accompanying address/control bus or other bus structure as can be appreciated.

Stored in the memory 1104 are both data and several components that are executable by the processor 1102. In particular, stored in the memory 1104 and executable by the processor 1102 are sales contact security application 115, sales contact security training application, historical data 112, and potentially other applications. Also stored in the memory 1104 may be a data store 106 and other data. In addition, an operating system may be stored in the memory 1104 and executable by the processor 1102.

It is understood that there may be other applications that are stored in the memory 1104 and are executable by the processor 1102 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1104 and are executable by the processor 1102. In this respect, the term "executable" means a program file that is in a form that can ultimately be run by the processor 1102. Examples of executable programs may be, for example, a compiled program that can be translated into machine code in a format that can be loaded into a random access portion of the memory 1104 and run by the processor 1102, source code that may be expressed in proper format such as object code that is capable of being loaded into a random access portion of the memory 1104 and executed by the processor 1102, or source code that may be interpreted by another executable program to generate instructions in a random access portion of the memory 1104 to be executed by the processor 1102, etc. An executable program may be stored in any portion or component of the memory 1104 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1104 is defined herein as including both volatile and nonvolatile memory and data storage components. Volatile components are those that do not retain data values upon loss of power. Nonvolatile components are those that retain data upon a loss of power. Thus, the memory 1104 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1102 may represent multiple processors 1102 and the memory 1104 may represent multiple memories 1104 that operate in parallel processing circuits, respectively. In such a case, the local interface 1106 may be an appropriate network that facilitates communication between any two processors, between any processor 1102 and any of the memories 1104, or between any two of the memories 1104, etc. The local interface 1106 may comprise additional systems designed to coordinate this communication, including, for example, performing load balancing. The processor 1102 may be of electrical or of some other available construction.

Although the sales contact security application 115, the sales contact security training application 116, the historical data 112, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

One should also note that while FIG. 11 describes the computing device 104, similar descriptions may also be applied to sales contact system 120, sales client 118, and/or administrator client 128, as well as the corresponding logic associated with these systems. More specifically one or more of these systems may also include a processor, memory, local interface, and/or other components described with reference to FIG. 11.

The flowcharts of FIGS. 8-10 illustrate functionality and operation of an implementation of portions of the sales contact security application 115 and/or the sales contact security training application 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1102 in a computer system or other system. The machine code may be converted from the source code, etc. If embodied in hardware, each block may represent a circuit or a number of interconnected circuits to implement the specified logical function(s).

Although the flowcharts of FIGS. 8-10 illustrate a specific order of execution, it is understood that the order of execution may differ from that which is depicted. For example, the order of execution of two or more blocks may be scrambled relative to the order shown. Also, two or more blocks shown in succession in FIGS. 8-10 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including electronic commerce application 113, sales contact input application 114, sales contact security application 115, sales contact security training application 116, sales contact input application 114, and browser 124, that comprises software or code can be embodied in any computer-readable medium for use by or in connection with an instruction execution system such as, for example, a processor 1102 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable storage medium having a plurality of computer instructions executable by a computing resource, wherein, when executed, the plurality of computer instructions cause the computing resource to:
receive data regarding a potential advertiser for an online retailer, the data regarding the potential advertiser being received from a sales client that provides an interface utilized for submitting the data regarding the potential advertiser;
determine, from the data regarding the potential advertiser, that at least one previous security check has been performed on the potential advertiser;
determine that there is a plurality of security checks for the potential advertiser;
implement the plurality of security checks to determine whether the potential advertiser is a security threat for uploading a malware to a network site of the online retailer, implementing the plurality of security checks comprising:
determining a first weighted value based at least in part on a determination that a submitted email address associated with the potential advertiser is similar to a valid email address according to a threshold; and
determining a second weighted value based at least in part on a comparison of a value of a proposed begin date of a potential advertisement associated with the potential advertiser to an average value of a plurality of other begin dates associated with other potential advertisements;

determine that a weighted score for the potential advertiser exceeds a threshold score based at least in part on the first weighted value and the second weighted value; and render for display, in response to determining that the weighted score exceeds the threshold score, an indicator substantially near the submitted email address on a user interface, the indicator representing the likelihood that the potential advertiser is a potential security risk.

2. The non-transitory computer-readable storage medium of claim 1, wherein the data regarding the potential advertiser for the online retailer is received from a sales application of the sales client or an email application of the sales client.

3. A method, comprising:
receiving, by at least one processor in a computing device, contact data regarding a sales contact for a network site;
performing, by the at least one processor in the computing device, a plurality of security checks on the contact data to determine a likelihood that the sales contact is a security risk for incorporating a malware to the network site of an online retailer, performing the plurality of security checks comprising:
determining a first weighted value based at least in part on a determination that a submitted email address associated with the sales contact is similar to a valid email address according to a threshold; and
determining a second weighted value based at least in part on a comparison of a value of a proposed begin date of a potential advertisement associated with the sales contact to an average value of a plurality of other begin dates associated with other potential advertisements;
determining, by the at least one processor in the computing device, that a weighted score for the sales contact exceeds a threshold score based at least in part on the first weighted value and the second weighted value; and
implementing, by the at least one processor in the computing device, in response to determining that the weighted score exceeds the threshold score, at least one security measure that includes rendering for display an indicator substantially near the submitted email address on a user interface, the indicator representing the likelihood that the sales contact a potential security risk.

4. The method of claim 3, wherein the sales contact is a potential advertiser, and implementing at least one security measure includes at least one of the following:
analyzing, by the at least one processor in the computing device, code associated with the potential advertisement of the potential advertiser; and
preventing, by the at least one processor in the computing device, the potential advertiser from advertising on the network site.

5. The method of claim 3, wherein performing the plurality of security checks on the contact data includes at least one of the following: determining, by the at least one processor in the computing device, whether a duration for displaying the potential advertisement on the network site satisfies a threshold, or determining, by the at least one processor in the computing device, whether a price for the potential advertisement satisfies the threshold.

6. The method of claim 3, wherein the plurality of security checks includes a plurality of criteria, wherein the at least one of the plurality of criteria is configurable by a user.

7. The method of claim 3, wherein determining that the weighted score for the sales contact exceeds the threshold score further comprises
comparing, by the at least one processor in the computing device, a summation of the first weighted value and the second weighted value to the threshold score.

8. The method of claim 3, further comprising determining, by the at least one processor in the computing device, that a prior security check has previously been performed for the sales contact.

9. The method of claim 3, further comprising determining, by the at least one processor in the computing device, that there is at least one sales contact-specific security check to perform for the sales contact.

10. The method of claim 3, further comprising automatically determining, by the at least one processor in the computing device, at least one criterion for the plurality of security checks based at least in part on a plurality of other security checks for a plurality of other sales contacts.

11. The method of claim 3, wherein performing the plurality of security checks comprises determining that a network address associated with the sales contact corresponds to a predefined geographic region.

12. The method of claim 3, wherein performing the plurality of security checks comprises performing a search of online communities for at least one disparaging comment associated with the sales contact.

13. A system comprising:
at least one computing device; and
an application executable in the at least one computing device, the application causing the at least one computing device to:
receive a request for a security check on a potential advertiser for a network site;
determine that the potential advertiser is associated with an advertiser-specific security check;
perform the advertiser-specific security check to determine whether the potential advertiser is a security risk for incorporating a malware on the network site, wherein performing the advertiser-specific security check comprises:
determining a first weighted value based at least in part on a determination that a submitted email address associated with the potential advertiser is similar to a valid email address according to a threshold; and
determining a second weighted value based at least in part on a comparison of a value of a proposed begin date of a potential advertisement associated with the potential advertiser to an average value of a plurality of other begin dates associated with other potential advertisements;
determine that a weighted score for the potential advertiser exceeds a threshold score based at least in part on the first weighted value and the second weighted value; and
implement at least one security measure that includes rendering for display an indicator substantially near the submitted email address on a user interface, the indicator representing the likelihood that the potential advertiser is a potential security risk.

14. The system of claim 13, wherein the performing the advertiser-specific security check includes at least one of the following: determining that a duration for displaying the potential advertisement on the network site satisfies a threshold, or determining that a price for the potential advertisement satisfies the threshold.

15. The system of claim 13, wherein the application further causes the at least one computing device to perform a general rules-based security check on the potential advertiser.

16. The system of claim 13, wherein the potential advertiser is received from at least one of the following: a client development application from a sales client or an email application from the sales client.

17. The system of claim 13, wherein the application further causes the at least one computing device to automatically determine at least one criterion for the advertiser-specific security check based on a plurality of other security checks for a plurality of other potential advertisers.

18. The system of claim 13, wherein implementing at least one security measure includes at least one of the following: analyzing code associated with the potential advertisement associated with the potential advertiser and preventing the potential advertiser from advertising on the network site.

19. The system of claim 13, wherein the application further causes the at least one computing device to determine that a prior security check has previously been performed for the potential advertiser.

20. The system of claim 13, wherein the determination that the submitted email address associated with the potential advertiser is similar to the valid email address according to the threshold further comprises determining that a first email domain of the submitted email address is one character different from a second email domain of the valid email address.

* * * * *